United States Patent
Wang et al.

(10) Patent No.: US 11,224,066 B2
(45) Date of Patent: Jan. 11, 2022

(54) METHOD OF DETERMINING SEARCH SPACE OF CARRIER, TERMINAL AND NETWORK DEVICE

(71) Applicant: DATANG MOBILE COMMUNICATIONS EQUIPMENT CO., LTD., Beijing (CN)

(72) Inventors: Lei Wang, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/280,867

(22) PCT Filed: Sep. 19, 2019

(86) PCT No.: PCT/CN2019/106664
§ 371 (c)(1),
(2) Date: Mar. 26, 2021

(87) PCT Pub. No.: WO2020/063440
PCT Pub. Date: Apr. 2, 2020

(65) Prior Publication Data
US 2021/0314998 A1    Oct. 7, 2021

(30) Foreign Application Priority Data
Sep. 29, 2018   (CN) .......................... 201811146099.0

(51) Int. Cl.
*H04W 72/12*   (2009.01)
*H04W 24/08*   (2009.01)
(Continued)

(52) U.S. Cl.
CPC ... *H04W 72/1289* (2013.01); *H04L 27/26025* (2021.01); *H04W 8/24* (2013.01); *H04W 24/08* (2013.01); *H04W 72/0453* (2013.01)

(58) Field of Classification Search
CPC ......... H04W 72/1289; H04W 72/0453; H04W 8/24; H04W 24/08; H04L 27/26025
(Continued)

(56) References Cited

U.S. PATENT DOCUMENTS

| | | |
|---|---|---|
| 2015/0365964 A1 | 12/2015 | Jiang et al. |
| 2017/0006584 A1 | 1/2017 | Ren et al. |

(Continued)

FOREIGN PATENT DOCUMENTS

| | | |
|---|---|---|
| CN | 102056185 A | 5/2011 |
| CN | 102378269 A | 3/2012 |
| CN | 103929289 A | 7/2014 |

OTHER PUBLICATIONS

The International Search Report of PCT application No. PCT/CN2019/106664, dated Nov. 28, 2019 and its English translation provided by WIPO.

(Continued)

*Primary Examiner* — Peter G Solinsky
(74) *Attorney, Agent, or Firm* — Ladas & Parry, LLP

(57) ABSTRACT

A method of determining a search space of a carrier, a terminal and a network device are provided. The method of determining the search space of the carrier includes: in a case that cross-carrier scheduling is configured, determining, according to a search space of a scheduling carrier configured by a network device and a scaling factor, a search space of a carrier other than the scheduling carrier.

20 Claims, 3 Drawing Sheets

In a case that cross-carrier scheduling is configured for a terminal, determine, according to a search space of a scheduling carrier configured for the terminal and a scaling factor, a search space of a carrier other than the scheduling carrier — 41

↓

Send a PDCCH of a scheduled carrier in a search space of the scheduled carrier — 42

(51) Int. Cl.
   *H04W 72/04*   (2009.01)
   *H04L 27/26*   (2006.01)
   *H04W 8/24*    (2009.01)

(58) Field of Classification Search
   USPC .......................................................... 370/329
   See application file for complete search history.

(56) References Cited

U.S. PATENT DOCUMENTS

2019/0253925 A1* 8/2019 Gholmieh ......... H04W 28/0215
   2021/0144700 A1* 5/2021 Lee ....................... H04L 5/0094

OTHER PUBLICATIONS

The Written Opinion of PCT application No. PCT/CN2019/106664, dated Nov. 28, 2019 and its English Translation provided by WIPO.
Guangdong OPPO Mobile Telecom, "Discussion of search space design," 3GPP TSG RAN WG1 Meeting NR#3, R1-1715686, Nagoya, Japan, Sep. 18-21, 2017, entire document.
NTT DOCOMO, Inc., "Search space," 3GPP TSG RAN WG1 Meeting #92bis, R1-1805048, Sanya, China, Apr. 16-20, 2018, entire document.
Extended European Search Report from EP app. No. 19865539.1, dated Nov. 8, 2021.
Samsung, "Remaining Issues on PDCCH and Search Space Design", R1-1808753, 3GPP TSG RAN WG1 Meeting #94, Gothenburg, Sweden, Aug. 20-24, 2018, all pages.

\* cited by examiner

In a case that cross-carrier scheduling is configured for a terminal, determine, according to a search space of a scheduling carrier configured for the terminal and a scaling factor, a search space of a carrier other than the scheduling carrier ⸺41

Send a PDCCH of a scheduled carrier in a search space of the scheduled carrier ⸺42

METHOD OF DETERMINING SEARCH SPACE OF CARRIER, TERMINAL AND NETWORK DEVICE

CROSS-REFERENCE TO RELATED APPLICATION

This application is the U.S. national phase of PCT Application No. PCT/CN2019/106664 filed on Sep. 19, 2019, which claims a priority to Chinese patent application No. 201811146099.0 filed in China on Sep. 29, 2018, the disclosures of which are incorporated in their entirety by reference herein.

TECHNICAL FIELD

The present disclosure relates to the field of communications technologies, and in particular to a method of determining a search space of a carrier, a terminal and a network device.

BACKGROUND

In LTE systems, when cross-carrier scheduling is configured, a terminal determines in which cell monitoring of its Physical Downlink Control Channel (PDCCH) is performed, according to a scheduling cell I configured by higher layer signaling, and determines a resource position of a search space through a Carrier Indicator Field (CIF).

Currently, for a cross-carrier scheduling scenario, a size of a search space of a scheduled carrier needs to be the same as a size of a search space of a scheduling carrier. However, considering that numerologies (parameter sets) of different carriers are different and scheduling requirements on different carriers are different, configuring the search spaces to have the same size may limit flexibility of network configuration.

In $5^{th}$ generation (5G) mobile communication systems, it is needed to support cross-carrier scheduling with different subcarrier spacings, that is, a scheduling carrier and a scheduled carrier may have different subcarrier spacings. When subcarrier spacings are different, blind detection capabilities corresponding to the terminal are different. A base station needs to configure search spaces having different sizes for different scheduling carriers according to a system scheduling situation and blind detection capabilities of the terminal. Currently, there is no specific method for how to configure search spaces having different sizes for different scheduling carriers.

SUMMARY

Embodiments of the present disclosure provide a method of determining a search space of a carrier, a terminal and a network device. Flexible search space configuration is realized without introducing additional signaling overhead.

To solve the above technical problem, the following technical schemes are provided in embodiments of the present disclosure.

A method of determining a search space of a carrier is applied to a terminal and includes: in a case that cross-carrier scheduling is configured, determining, according to a search space of a scheduling carrier configured by a network device and a scaling factor, a search space of a carrier other than the scheduling carrier.

The scaling factor is determined based on blind detection capabilities of the terminal on different subcarriers, and/or a proportional relationship between subcarrier spacings of the scheduling carrier and a scheduled carrier.

The scaling factor K is $$\frac{M_{cap,scheduled}}{M_{cap,scheduling}} \text{ or } \left\lceil \frac{M_{cap,scheduled}}{M_{cap,scheduling}} \right\rceil, \text{ or } \left\lfloor \frac{M_{cap,scheduled}}{M_{cap,scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$\lceil \ \rceil$ refers to rounding up, and $\lfloor \ \rfloor$ refers to rounding down.

The scaling factor K is:

$$\frac{M_{cap,scheduled}}{M_{cap,scheduling}} \times \frac{SCS_{scheduled}}{SCS_{scheduling}}, \text{ or }$$

$$\left\lceil \frac{M_{cap,scheduled}}{M_{cap,scheduling}} \times \frac{SCS_{scheduled}}{SCS_{scheduling}} \right\rceil, \text{ or }$$

$$\left\lfloor \frac{M_{cap,scheduled}}{M_{cap,scheduling}} \times \frac{SCS_{scheduled}}{SCS_{scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$SCS_{scheduled}$ is the subcarrier spacing of the scheduled carrier, and $SCS_{scheduling}$ is the subcarrier spacing of the scheduling carrier.

$\lceil \ \rceil$ refers to rounding up, and $\lfloor \ \rfloor$ refers to rounding down.

Determining, according to the search space configured by the network device for the scheduling carrier and the scaling factor, the search space of the carrier other than the scheduling carrier includes: determining, according to the search space configured by the network device for the scheduling carrier and the scaling factor, a search space of a scheduled carrier.

The determining, according to the search space configured by the network device for the scheduling carrier and the scaling factor, the search space of the scheduled carrier includes: determining, according to the quantity of candidate physical downlink control channels (PDCCH) included in each aggregation level of the scheduling carrier and the scaling factor, the quantity of candidate PDCCHs included in each aggregation level of the search space of the scheduled carrier; and determining, according to the quantity of candidate PDCCHs included in each aggregation level of the search space of the scheduled carrier, the search space of the scheduled carrier.

Determining, according to the quantity of candidate PDCCHs included in each aggregation level of the scheduling carrier and the scaling factor, the quantity of candidate PDCCHs included in each aggregation level of the scheduled carrier includes: determining the quantity of candidate PDCCHs included in each aggregation level of the scheduled carrier through $AL_{Y,scheduled} = \lceil AL_{Y,scheduling} \times K \rceil$ or $AL_{Y,scheduled} = \lfloor AL_{Y,scheduling} \times K \rfloor$.

$AL_{Y,scheduled}$ is the quantity of candidate PDCCHs included in each aggregation level of the scheduled carrier.

K is a scaling factor of the scheduling carrier.

$\lceil \ \rceil$ refers to rounding up, and $\lfloor \ \rfloor$ refers to rounding down.

In a case that $AL_{Y,scheduling} \neq 0$, a minimum value of $AL_{Y,scheduled}$ is 1.

The search space of the scheduling carrier is larger than a search space of a scheduled carrier.

A starting position of the search space of the scheduled carrier in the search space of the scheduling carrier is determined according to a value of a carrier indicator field (CIF).

The method of determining the search space of the carrier further includes: monitoring a PDCCH of a scheduled carrier in a search space of the scheduled carrier.

Embodiments of the present disclosure further provide a method of determining a search space of a carrier, and the method is applied to a network device and includes: in a case that cross-carrier scheduling is configured for a terminal, determining, according to a search space of a scheduling carrier configured for the terminal and a scaling factor, a search space of a carrier other than the scheduling carrier.

The scaling factor is determined based on blind detection capabilities of the terminal on different subcarriers, and/or a proportional relationship between subcarrier spacings of the scheduling carrier and a scheduled carrier.

The scaling factor K is $$\frac{M_{cap,scheduled}}{M_{cap,scheduling}}, \left\lceil \frac{M_{cap,scheduled}}{M_{cap,scheduling}} \right\rceil, \text{ or } \left\lfloor \frac{M_{cap,scheduled}}{M_{cap,scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$\lceil\ \rceil$ refers to rounding up, and $\lfloor\ \rfloor$ refers to rounding down.

The scaling factor K is:

$$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$SCS_{scheduled}$ is the subcarrier spacing of the scheduled carrier, and $SCS_{scheduling}$ is the subcarrier spacing of the scheduling carrier.

$\lceil\ \rceil$ refers to rounding up, and $\lfloor\ \rfloor$ refers to rounding down.

The determining, according to the search space of the scheduling carrier configured for the terminal and the scaling factor, the search space of the carrier other than the scheduling carrier includes: determining, according to the search space of the scheduling carrier configured for the terminal and the scaling factor, a search space of a scheduled carrier.

The determining, according to the search space of the scheduling carrier configured for the terminal and the scaling factor, the search space of the scheduled carrier includes: determining, according to the quantity of candidate physical downlink control channels (PDCCH) included in each aggregation level of the scheduling carrier and the scaling factor, the quantity of candidate PDCCHs included in each aggregation level of the search space of the scheduled carrier; and determining, according to the quantity of candidate PDCCHs included in each aggregation level of the search space of the scheduled carrier, the search space of the scheduled carrier.

The determining, according to the quantity of candidate PDCCHs included in each aggregation level of the scheduling carrier and the scaling factor, the quantity of candidate PDCCHs included in each aggregation level of the scheduled carrier includes: determining the quantity of candidate PDCCHs included in each aggregation level of the scheduled carrier through $AL_{Y,scheduled} = \lceil AL_{Y,scheduling} \times K \rceil$ or $AL_{Y,scheduled} = \lfloor AL_{Y,scheduling} \times K \rfloor$.

$AL_{Y,scheduled}$ is the quantity of candidate PDCCHs included in each aggregation level of the scheduled carrier.

K is a scaling factor of the scheduling carrier.

$\lceil\ \rceil$ refers to rounding up, and $\lfloor\ \rfloor$ refers to rounding down.

In a case that $AL_{Y,scheduling} \neq 0$, a minimum value of $AL_{Y,scheduled}$ is 1.

The search space of the scheduling carrier is larger than a search space of a scheduled carrier.

A starting position of the search space of the scheduled carrier in the search space of the scheduling carrier is determined according to a value of a carrier indicator field (CIF).

The method of determining the search space of the carrier further includes: sending a PDCCH of a scheduled carrier in a search space of the scheduled carrier.

Embodiments of the present disclosure further provide a terminal, and the terminal includes: a processor configured to, in a case that cross-carrier scheduling is configured, determine, according to a search space of a scheduling carrier configured by a network device and a scaling factor, a search space of a carrier other than the scheduling carrier.

Embodiments of the present disclosure further provide an apparatus for determining a search space of a carrier, and the apparatus includes: a processing module configured to, in a case that cross-carrier scheduling is configured, determine, according to a search space of a scheduling carrier configured by a network device and a scaling factor, a search space of a carrier other than the scheduling carrier.

Embodiments of the present disclosure further provide a terminal, and the terminal includes: a processor configured to perform the following function: in a case that cross-carrier scheduling is configured, determining, according to a search space of a scheduling caner configured by a network device and a scaling factor, a search space of a carrier other than the scheduling carrier.

Embodiments of the present disclosure further provide a network device, and the network device includes: a processor configured to, in a case that cross-carrier scheduling is configured for a terminal, determine, according to a search space of a scheduling carrier configured for the terminal and a scaling factor, a search space of a carrier other than the scheduling carrier.

Embodiments of the present disclosure further provide an apparatus for configuring the quantity of beams, and the apparatus includes: a processing module configured to, in a case that cross-carrier scheduling is configured for a terminal, determine, according to a search space of a scheduling carrier configured for the terminal and a scaling factor, a search space of a carrier other than the scheduling carrier.

Embodiments of the present disclosure further provide a network device, and the network device includes: a processor configured to perform the following function: in a case that cross-carrier scheduling is configured for a terminal, determining, according to a search space of a scheduling carrier configured for the terminal and a scaling factor, a search space of a carrier other than the scheduling carrier.

Embodiments of the present disclosure further provide a computer storage medium including instructions, where the instructions, when being executed on a processor, configure the processor to implement the methods as described above.

Beneficial effects of embodiments of the present disclosure are as follows.

In the embodiments of the present disclosure, a size of the search space of the scheduled carrier is determined according to subcarrier spacings of different carriers and blind detection capabilities of the terminal on different carriers, so as to realize flexible search space configuration without introducing additional signaling overhead.

DETAILED DESCRIPTION

Exemplary embodiments of the present disclosure are described in more detail with reference to the accompanying drawings hereinafter. Although the drawings show exemplary embodiments of the present disclosure, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

Figure 1:
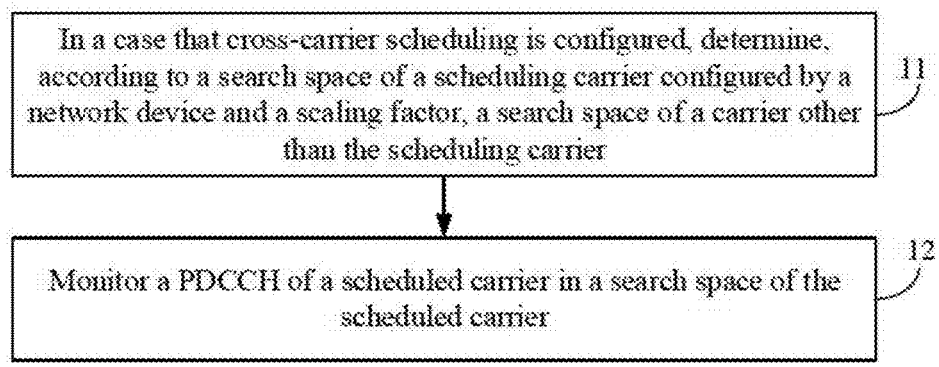
FIG. 1 is a flowchart of a method of determining a search space of a carrier on a terminal side of the present disclosure.

As shown in FIG. 1, embodiments of the present disclosure provide a method of determining a search space of a carrier, and the method is applied to a terminal and includes the following step.

Step 11: in a case that cross-carrier scheduling is configured, determining, according to a search space of a scheduling carrier configured by a network device and a scaling factor, a search space of a carrier other than the scheduling carrier.

The scaling factor is determined based on blind detection capabilities of the terminal on different subcarriers, and/or a proportional relationship between subcarrier spacings of the scheduling carrier and a scheduled carrier.

The scaling factor K is $$\frac{M_{cap,scheduled}}{M_{cap,scheduling}}, \left\lceil \frac{M_{cap,scheduled}}{M_{cap,scheduling}} \right\rceil, \text{ or } \left\lfloor \frac{M_{cap,scheduled}}{M_{cap,scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$\lceil \ \rceil$ refers to rounding up, and $\lfloor \ \rfloor$ refers to rounding down. The scaling factor K may also be:

$$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$SCS_{scheduled}$ is the subcarrier spacing of the scheduled carrier, and $SCS_{scheduling}$ is the subcarrier spacing of the scheduling carrier; $\lceil \ \rceil$ refers to rounding up, and $\lfloor \ \rfloor$ refers to rounding down.

In a specific embodiment of the present disclosure, step 11 further includes the following step.

Step 111: determining, according to the search space configured by the network device for the scheduling carrier and the scaling factor, a search space of a scheduled carrier.

Specifically, step 111 includes the following steps.

Step 1111: determining, according to the quantity of candidate Physical Downlink Control Channels (PDCCH) included in each aggregation level of the scheduling carrier and the scaling factor, the quantity of candidate PDCCHs included in each aggregation level of the search space of the scheduled carrier.

Step 1112: determining, according to the quantity of candidate PDCCHs included in each aggregation level of the search space of the scheduled carrier, the search space of the scheduled carrier.

The quantity of candidate PDCCHs included in each aggregation level of the scheduled carrier is determined through $AL_{Y,scheduled} = \lceil AL_{Y,scheduling} \times K \rceil$ or $AL_{Y,scheduled} = \lfloor AL_{Y,scheduling} \times K \rfloor$.

$AL_{Y,scheduled}$ is the quantity of candidate PDCCHs included in each aggregation level of the scheduled carrier; K is a scaling factor of the scheduling carrier; $\lceil \ \rceil$ refers to rounding up, and $\lfloor \ \rfloor$ refers to rounding down.

In a case that $AL_{Y,scheduling} \neq 0$, a minimum value of $AL_{Y,scheduled}$ is 1.

In a specific embodiment of the present disclosure, the search space of the scheduling carrier is larger than a search space of a scheduled carrier. The subcarrier spacings of the scheduling carrier and the scheduled carrier are not limited, that is, the subcarrier spacing of the scheduling carrier may be larger or smaller than the subcarrier spacing of the scheduled carrier.

A starting position of the search space of the scheduled carrier in the search space of the scheduling carrier is determined according to a value of a Carrier Indicator Field (CIF). A size of the corresponding search space may be determined according to the scaling factor determined by the above method.

In a specific embodiment of the present disclosure, the method of determining the search space of the carrier further includes the following step.

Step 12: monitoring a PDCCH of a scheduled carrier in a search space of the scheduled carrier.

A specific implementation process of the foregoing embodiments is described below in combination with specific examples.

Figure 2:
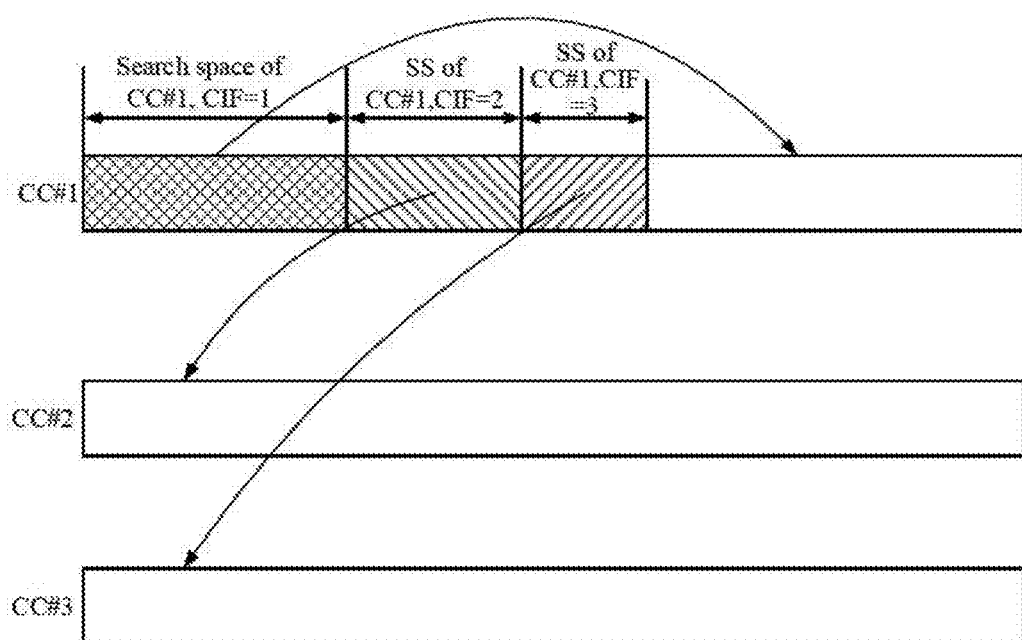
FIG. 2 is a schematic diagram of an implementation scheme of a method of determining a search space of a carrier of the present disclosure.

Example 1: as shown in FIG. 2, it is assumed that a base station configures three carriers: CC#1, CC#2, and CC#3, for a terminal, and the base station schedules the CC#2 and the CC#3 on the CC#1. It is assumed that a subcarrier spacing of the CC1# is 15 kHz, a subcarrier spacing of the CC#2 is 30 kHz, and a subcarrier spacing of the CC#3 is 60 kHz.

Correspondingly, a blind detection capability of the terminal on the CC#1 is 44 BDs, a blind detection capability of the terminal on the CC#2 is 36, and a blind detection capability of the terminal on the CC#3 is 22.

It is assumed that a search space configured by the base station for data transmission on the CC#1 includes one PDCCH candidate (candidate PDCCH) with AL=16, two PDCCH candidates with AL=8, four PDCCH candidates with AL=4, four PDCCH candidates with AL=2, six PDCCH candidates with AL=1. That is, $SS_{scheduling} = \{1AL_{16}, 2AL_8, 4AL_4, 4AL_2, 6AL_1\}$.

When determining search spaces $SS_{scheduled,2}$ and $SS_{scheduled,3}$ of the CC#2 and the CC#3, the base station determines, according to a size of the search space configured for the scheduling carrier CC#1 and a scaling factor K, sizes of the two search spaces, that is, the included aggregation levels and the quantity of PDCCH candidates included in each aggregation level.

The scaling factor is determined by the following formula.

For a scaling factor K2 of the carrier CC#2, $$K2 = \frac{M_{cap,scheduled,2}}{M_{cap,scheduling}} = \frac{36}{44} = 0.82;$$

For a scaling factor K3 of the carrier CC#3, $$K3 = \frac{M_{cap,scheduled,3}}{M_{cap,scheduling}} = \frac{22}{44} = 0.5;$$

Correspondingly, a search space $SS_{scheduled,2}$ corresponding to the CC#2 is:

⌈{1×K2AL₁₆,2×K2AL₈,4×K2AL₄,4×K2AL₂,6×K2AL₁}⌉={1AL₁₆,2AL₈,4AL₄,4AL₂,5AL₁}; or,

⌊{1×K2AL₁₆,2×K2AL₈,4×K2AL₄,4×K2AL₂,6×K2AL₁}⌋={1AL₈,3AL₄,3AL₂,4AL₁}.

A search space $SS_{scheduled,3}$ corresponding to the CC#3 is:

⌈{1×K3AL₁₆,2×K3AL₈,4×K3AL₄,4×K3AL₂,6×K3AL₁}⌉={1AL₁₆,1AL₈,2AL₄,2AL₂,3AL₁}; or,

⌊{1×K3AL₁₆,2×K3AL₈,4×K3AL₄,4×K3AL₂,6×K3AL₁}⌋={1AL₈,3AL₄,3AL₂,4AL₁}.

Specific resource positions of the CC#2 and the CC#3 may be determined according to carrier indication notified by higher layer signaling. The terminal monitors, in the determined search spaces, PDCCHs scheduling different carriers.

The scaling factor may be acquired by rounding up or rounding down, which is not limited in the embodiments of the present disclosure.

Figures 3, 4:
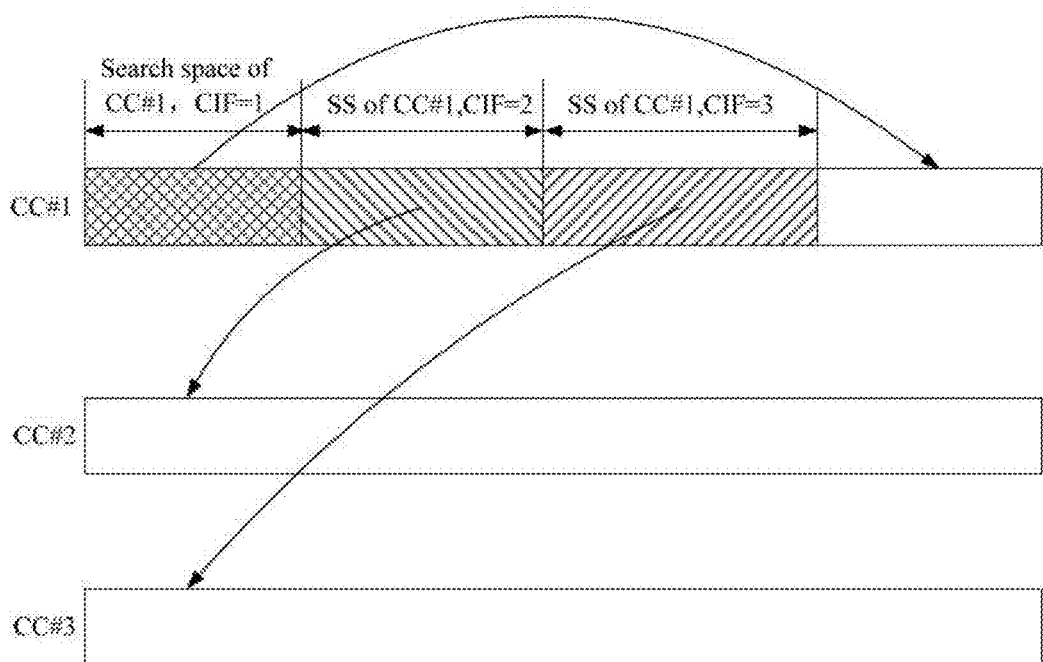
FIG. 3 is a schematic diagram of another implementation scheme of a method of determining a search space of a carrier of the present disclosure.
FIG. 4 is a flowchart of a method of determining a search space of a carrier on a network device side of the present disclosure.

Example 2: as shown in FIG. 3, it is assumed that a base station configures three carriers: CC#1, CC#2, and CC#3, for a terminal, and the base station schedules the CC#2 and the CC#3 on the CC#1. It is assumed that a subcarrier spacing of the CC1# is 15 kHz, a subcarrier spacing of the CC#2 is 30 kHz, and a subcarrier spacing of the CC#3 is 60 kHz.

Correspondingly, a blind detection capability of the terminal on the CC#1 is 44 BDs, a blind detection capability of the terminal on the CC#2 is 36, and a blind detection capability of the terminal on the CC#3 is 22.

It is assumed that a search space configured by the base station for data transmission on the CC#1 includes one PDCCH candidate with AL=16, two PDCCH candidates with AL=8, four PDCCH candidates with AL=4, four PDCCH candidates with AL=2, six PDCCH candidates with AL=1. That is, $SS_{scheduling} = \{1AL_{16}, 2AL_8, 4AL_4, 4AL_2, 6AL_1\}$.

When determining search spaces $SS_{scheduled,2}$ and $SS_{scheduled,3}$ of the CC#2 and the CC#3 for data scheduling, the base station determines, according to a size of the search space configured for the scheduling carrier CC#1 and a scaling factor K, sizes of the two search spaces, that is, the included aggregation levels and the quantity of PDCCH candidates included in each aggregation level.

The scaling factor is determined by the following formula.

For a scaling factor K2 of the carrier CC#2.

$$K2 = \frac{M_{cap,scheduled,2}}{M_{cap,scheduling}} \times \frac{SCS_{scheduled,2}}{SCS_{scheduling}} = \frac{36}{44} \times \frac{30}{15} = 1.64$$

For a scaling factor K3 of the carrier CC#3, $$K3 = \frac{M_{cap,scheduled,3}}{M_{cap,scheduling}} \times \frac{SCS_{scheduled,3}}{SCS_{scheduling}} = \frac{22}{44} \times \frac{60}{15} = 2$$

Correspondingly, a search space $SS_{scheduled,2}$ corresponding to the CC#2 is:

⌈{1×K2AL₁₆,2×K2AL₈,4×K2AL₄,4×K2AL₂,6×K2AL₁}⌉={2AL₁₆,4AL₈,7AL₄,7AL₂,10AL₁}; or,

⌊{1×K2AL₁₆,2×K2AL₈,4×K2AL₄,4×K2AL₂,6×K2AL₁}⌋={1AL₁₆,2AL₈,6AL₄,6AL₂,9AL₁}.

A search space $SS_{scheduled,3}$ corresponding to the CC#3 is:

⌈{1×K3AL₁₆,2×K3AL₈,4×K3AL₄,4×K3AL₂,6×K3AL₁}⌉={2AL₁₆,4AL₈,8AL₄,8AL₂,12AL₁}; or

⌊{1×K3AL₁₆,2×K3AL₈,4×K3AL₄,4×K3AL₂,6×K3AL₁}⌋={2AL₁₆,4AL₈,8AL₄,8AL₂,12AL₁}.

Specific resource positions of the CC#2 and the CC#3 may be determined according to carrier indication notified by higher layer signaling. The terminal monitors, in the determined search spaces, PDCCHs scheduling different carriers.

The scaling factor may be acquired by rounding up or rounding down, which is not limited in the embodiments of the present disclosure.

In the embodiments of the present disclosure, when the quantity of PDCCH candidates included in a certain aggregation level of the search space of the scheduling carrier is not zero and the quantity of PDCCH candidates included in the corresponding aggregation level of a search space corresponding to the scheduled carrier which is calculated based on the scaling factor is zero, in this case, it is considered that the aggregation level of the search space corresponding to the scheduled carrier includes one PDCCH candidate.

The subcarrier spacings of the scheduling carrier and the scheduled carrier are not limited, that is, the subcarrier spacing of the scheduling carrier may be larger than the subcarrier spacing of the scheduled carrier.

The base station configures a relatively large search space for the scheduling carrier of the terminal. Further, the base station and the terminal determine a starting position of the search space of the scheduled carrier in the search space of the scheduling carrier according to a value of a CIF, and determine a size of the corresponding search space according to the scaling factor determined in the above method.

The base station sends a PDCCH of the scheduled carrier in the corresponding search space, and the terminal monitors the PDCCH of the scheduled carrier in the corresponding search space.

In the embodiments of the present disclosure, a size of the search space of the scheduled carrier is determined according to subcarrier spacings of different carriers and blind detection capabilities of the terminal on different carriers, so as to realize flexible search space configuration without introducing additional signaling overhead.

As shown in FIG. 4, embodiments of the present disclosure further provide a method of determining a search space of a carrier, and the method is applied to a network device and includes the following step.

Step 41: in a case that cross-carrier scheduling is configured for a terminal, determining, according to a search space of a scheduling carrier configured for the terminal and a scaling factor, a search space of a carrier other than the scheduling carrier.

The scaling factor is determined based on blind detection capabilities of the terminal on different subcarriers, and/or a proportional relationship between subcarrier spacings of the scheduling carrier and a scheduled carrier.

The scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$\lceil \ \rceil$ refers to rounding up, and $\lfloor \ \rfloor$ refers to rounding down.

The scaling factor K is:

$$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$SCS_{scheduled}$ is the subcarrier spacing of the scheduled carrier, and $SCS_{scheduling}$ is the subcarrier spacing of the scheduling carrier; $\lceil \ \rceil$ refers to rounding up, and $\lfloor \ \rfloor$ refers to rounding down.

The determining according to the search space of the scheduling carrier configured for the terminal and the scaling factor, the search space of the carrier other than the scheduling carrier includes: determining, according to the search space of the scheduling carrier configured for the terminal and the scaling factor, a search space of a scheduled carrier.

The determining, according to the search space of the scheduling carrier configured for the terminal and the scaling factor, the search space of the scheduled carrier includes: determining, according to the quantity of candidate Physical Downlink Control Channels (PDCCH) included in each aggregation level of the scheduling carrier and the scaling factor, the quantity of candidate PDCCHs included in each aggregation level of the search space of the scheduled carrier; and determining, according to the quantity of candidate PDCCHs included in each aggregation level of the search space of the scheduled carrier, the search space of the scheduled carrier.

The determining, according to the quantity of candidate PDCCHs included in each aggregation level of the scheduling carrier and the scaling factor, the quantity of candidate PDCCHs included in each aggregation level of the scheduled carrier includes: determining the quantity of candidate PDCCHs included in each aggregation level of the scheduled carrier through $AL_{Y,scheduled} = \lceil AL_{Y,scheduling} \times K \rceil$ or $AL_{Y,scheduled} = \lfloor AL_{Y,scheduling} \times K \rfloor$.

$AL_{Y,scheduled}$ is the quantity of candidate PDCCHs included in each aggregation level of the scheduled carrier; K is a scaling factor of the scheduling carrier; $\lceil \ \rceil$ refers to rounding up, and $\lfloor \ \rfloor$ refers to rounding down.

In a case that $AL_{Y,scheduling} \neq 0$, a minimum value of $AL_{Y,scheduled}$ is 1.

The search space of the scheduling carrier is larger than a search space of a scheduled carrier.

A starting position of the search space of the scheduled carrier in the search space of the scheduling carrier is determined according to a value of a Carrier Indicator Field (CIF).

The method of determining the search space of the carrier further includes the following step.

Step 42: sending a PDCCH of a scheduled carrier in a search space of the scheduled carrier.

In the embodiments of the present disclosure, when the quantity of PDCCH candidates included in a certain aggregation level of the search space of the scheduling carrier is not zero and the quantity of PDCCH candidates included in the corresponding aggregation level of a search space corresponding to the scheduled carrier which is calculated based on the scaling factor is zero, in this case, it is considered that the aggregation level of the search space corresponding to the scheduled carrier includes one PDCCH candidate.

The subcarrier spacings of the scheduling carrier and the scheduled carrier are not limited, that is, the subcarrier spacing of the scheduling carrier may be larger than the subcarrier spacing of the scheduled carrier.

The base station configures a relatively large search space for the scheduling carrier of the terminal. Further, the base station and the terminal determine a starting position of the search space of the scheduled carrier in the search space of the scheduling carrier according to a value of a CIF, and determine a size of the corresponding search space according to the scaling factor determined in the above method.

The base station sends a PDCCH of the scheduled carrier in the corresponding search space, and the terminal monitors the PDCCH of the scheduled carrier in the corresponding search space.

It should be noted that, the schemes of the embodiments shown in FIG. 3 and FIG. 4 are also applicable to this embodiment. In the embodiments of the present disclosure, a size of the search space of the scheduled carrier is determined according to subcarrier spacings of different carriers and blind detection capabilities of the terminal on different carriers, so as to realize flexible search space configuration without introducing additional signaling overhead.

Figure 5:
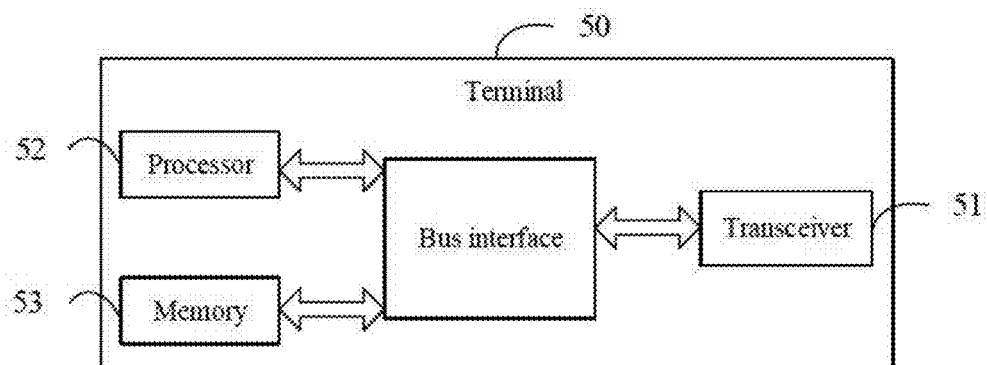
FIG. 5 is a schematic architecture diagram of a terminal of the present disclosure.

As shown in FIG. 5, embodiments of the present disclosure further provide a terminal 50, and the terminal 50 includes: a processor 52 configured to, in a case that cross-carrier scheduling is configured, determine, according to a search space of a scheduling carrier configured by a network device and a scaling factor, a search space of a carrier other than the scheduling carrier.

The scaling factor is determined based on blind detection capabilities of the terminal on different subcarriers, and/or a proportional relationship between subcarrier spacings of the scheduling carrier and a scheduled carrier.

The scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$\lceil\ \rceil$ refers to rounding up, and $\lfloor\ \rfloor$ refers to rounding down.

The scaling factor K may also be:

$$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$SCS_{scheduled}$ is the subcarrier spacing of the scheduled carrier, and $SCS_{scheduling}$ is the subcarrier spacing of the scheduling carrier; $\lceil\ \rceil$ refers to rounding up, and $\lfloor\ \rfloor$ refers to rounding down.

In a specific embodiment of the present disclosure, the processor 52 is specifically configured to: determine, according to the search space configured by the network device for the scheduling carrier and the scaling factor, a search space of a scheduled carrier.

Specifically, the quantity of candidate PDCCHs included in each aggregation level of the search space of the scheduled carrier is determined according to the quantity of candidate Physical Downlink Control Channels (PDCCH) included in each aggregation level of the scheduling carrier and the scaling factor.

The search space of the scheduled carrier is determined according to the quantity of candidate PDCCHs included in each aggregation level of the search space of the scheduled carrier.

The quantity of candidate PDCCHs included in each aggregation level of the scheduled carrier is determined through $AL_{Y,scheduled} = \lceil AL_{Y,scheduling} \times K \rceil$ or $AL_{Y,scheduled} = \lfloor AL_{Y,scheduling} \times K \rfloor$.

$AL_{Y,scheduled}$ is the quantity of candidate PDCCHs included in each aggregation level of the scheduled carrier; K is a scaling factor of the scheduling carrier; $\lceil\ \rceil$ refers to rounding up, and $\lfloor\ \rfloor$ refers to rounding down.

In a case that $AL_{Y,scheduling} \neq 0$, a minimum value of $AL_{Y,scheduled}$ is 1.

In a specific embodiment of the present disclosure, the search space of the scheduling carrier is larger than a search space of a scheduled carrier. The subcarrier spacings of the scheduling carrier and the scheduled carrier are not limited, that is, the subcarrier spacing of the scheduling carrier may be larger or smaller than the subcarrier spacing of the scheduled carrier.

A starting position of the search space of the scheduled carrier in the search space of the scheduling carrier is determined according to a value of a Carrier Indicator Field (CIF). A size of the corresponding search space may be determined according to the scaling factor determined by the above method.

In a specific embodiment of the present disclosure, the terminal further includes: a transceiver 51, configured to monitor a PDCCH of a scheduled carrier in a search space of the scheduled carrier.

The embodiment of the terminal is a terminal corresponding to the method shown in FIG. 1, all the implementations of the embodiments shown in FIG. 1 to FIG. 3 are applicable to this embodiment, and the same technical effects can be achieved. The terminal may further include a memory 53. Both the processor 52 and the memory 53 may communicate with the transceiver 51 through a bus interface. Functions of the processor 52 may be implemented by the transceiver 51, and functions of the transceiver 51 may be implemented by the processor 52.

Embodiments of the present disclosure further provide an apparatus for determining a search space of a carrier, and the apparatus includes: a processing module configured to, in a case that cross-carrier scheduling is configured, determine, according to a search space of a scheduling carrier configured by a network device and a scaling factor, a search space of a carrier other than the scheduling carrier.

It should be noted that, the embodiments shown in FIG. 1 to FIG. 3 are all applicable to this embodiment, and the same technical effects can be achieved.

Embodiments of the present disclosure further provide a terminal, and the terminal includes: a processor configured to perform the following function: in a case that cross-carrier scheduling is configured, determining according to a search space of a scheduling carrier configured by a network device and a scaling factor, a search space of a carrier other than the scheduling carrier.

It should be noted that, the embodiments shown in FIG. 1 to FIG. 3 are all applicable to this embodiment, and the same technical effects can be achieved.

Figure 6:
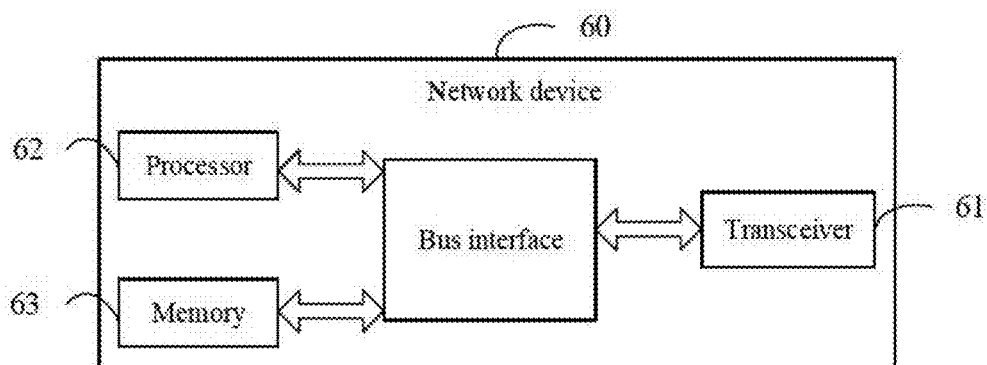
FIG. 6 is a schematic architecture diagram of a network device of the present disclosure.

As shown in FIG. 6, embodiments of the present disclosure further provide a network device 60, and the network device 60 includes: a processor 62 configured to, in a case that cross-carrier scheduling is configured for a terminal, determine, according to a search space of a scheduling carrier configured for the terminal and a scaling factor, a search space of a carrier other than the scheduling carrier.

The scaling factor is determined based on blind detection capabilities of the terminal on different subcarriers, and/or a proportional relationship between subcarrier spacings of the scheduling carrier and a scheduled carrier.

The scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier; $\lceil \ \rceil$ refers to rounding up, and $\lfloor \ \rfloor$ refers to rounding down.

The scaling factor K is:

$$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor.$$

$M_{cap,scheduled}$ is a blind detection capability of the terminal on the scheduled carrier.

$M_{cap,scheduling}$ is a blind detection capability of the terminal on the scheduling carrier.

$SCS_{scheduled}$ is the subcarrier spacing of the scheduled carrier, and $SCS_{scheduling}$ is the subcarrier spacing of the scheduling carrier; $\lceil \ \rceil$ refers to rounding up, and $\lfloor \ \rfloor$ refers to rounding down.

The processor 62 is specifically configured to: determine, according to the search space of the scheduling carrier configured for the terminal and the scaling factor, a search space of a scheduled carrier.

The determining, according to the search space of the scheduling carrier configured for the terminal and the scaling factor, the search space of the scheduled carrier includes: determining, according to the quantity of candidate Physical Downlink Control Channels (PDCCH) included in each aggregation level of the scheduling carrier and the scaling factor, the quantity of candidate PDCCHs included in each aggregation level of the search space of the scheduled carrier; and determining, according to the quantity of candidate PDCCHs included in each aggregation level of the search space of the scheduled carrier, the search space of the scheduled carrier.

The determining, according to the quantity of candidate PDCCHs included in each aggregation level of the scheduling carrier and the scaling factor, the quantity of candidate PDCCHs included in each aggregation level of the scheduled carrier includes: determining the quantity of candidate PDCCHs included in each aggregation level of the scheduled carrier through $AL_{Y,scheduled} = \lceil AL_{Y,scheduling} \times K \rceil$ or $AL_{Y,scheduled} = \lfloor AL_{Y,scheduling} \times K \rfloor$.

$AL_{Y,scheduled}$ is the quantity of candidate PDCCHs included in each aggregation level of the scheduled carrier.

K is a scaling factor of the scheduling carrier.

$\lceil \ \rceil$ refers to rounding up, and $\lfloor \ \rfloor$ refers to rounding down.

When $AL_{Y,scheduling} \neq 0$, a minimum value of $AL_{Y,scheduled}$ is 1.

The search space of the scheduling carrier is larger than a search space of a scheduled carrier.

A starting position of the search space of the scheduled carrier in the search space of the scheduling carrier is determined according to a value of a Carrier Indicator Field (CIF).

The network device may further include: a transceiver 61, configured to send a PDCCH of a scheduled carrier in a search space of the scheduled carrier.

The network device may further include: a memory 63, etc. Communication connections of the transceiver 61 and the memory 63, and of the transceiver 61 and the processor 62 may be implemented through a bus interface. Functions of the processor 62 may be implemented by the transceiver 61, and functions of the transceiver 61 may be implemented by the processor 62.

It should be noted that, the network device may be a base station, etc. All implementations of the methods shown in FIG. 2 to FIG. 4 are all applicable to this embodiment, and the same technical effects can be achieved.

Embodiments of the present disclosure further provide an apparatus for configuring the quantity of beams, and the apparatus includes: a processing module configured to, in a case that cross-carrier scheduling is configured for a terminal, determine, according to a search space of a scheduling carrier configured for the terminal and a scaling factor, a search space of a carrier other than the scheduling carrier.

It should be noted that, all implementations of the methods shown in FIG. 2 to FIG. 4 are all applicable to this embodiment, and the same technical effects can be achieved.

Embodiments of the present disclosure further provide a network device, and the network device includes: a processor configured to perform the following function: in a case that cross-carrier scheduling is configured for a terminal, determining, according to a search space of a scheduling carrier configured for the terminal and a scaling factor, a search space of a carrier other than the scheduling carrier. It should be noted that, all implementations of the methods shown in FIG. 2 to FIG. 4 are all applicable to this embodiment, and the same technical effects can be achieved.

Embodiments of the present disclosure further provide a computer storage medium including instructions, where the instruction, when being executed on a computer, configure the computer to implement the method described in FIG. 1 or FIG. 4.

In the embodiments of the present disclosure, a size of the search space of the scheduled carrier is determined according to subcarrier spacings of different carriers and blind detection capabilities of the terminal on different carriers, so as to realize flexible search space configuration without introducing additional signaling overhead.

Those skilled in the art will appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a detailed description thereof is not provided herein.

For the embodiments according to the present disclosure, it should be understood that the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or part of the technical solution, may be embodied in the form of a software product. The computer software product is stored in a storage medium, and the software product includes a number of instructions to enable a computer device (which may be a personal computer, a server, or a network device, etc.) to perform all or part of the steps of method described in the various embodiments of the present disclosure. The storage medium includes a USB flash disk, a mobile hard disk, an ROM, an RAM, a magnetic disk, an optical disk, and other medium which may store program code.

In addition, it should be noted that in the device and the method of the present disclosure, it is apparent that various components or various steps may be decomposed and/or recombined. The decomposition and/or recombination should be considered as equivalents of the present disclosure. Moreover, the steps of performing the above series of processes may naturally be performed in a chronological order or in an order as illustrated, but not necessarily be required to be performed in a chronological order, and some steps may be performed in parallel or independently of each other. It should be noted that, a person ordinary skilled in the art can understand that all or any steps or components of the method and device in the present disclosure may be implemented with hardware, firmware, software or any combination thereof in any computing device (including a processor and a storage medium and so on) or in a network of computing devices, which can be realized by a person skilled in the art with their basic programming skills on the basis of the present disclosure.

Therefore, the objects of the present disclosure may be achieved through running a program or a group of programs on any computing device. The computing device may be a well-known common device. Accordingly, the object of the present disclosure may be achieved by merely providing a program product having program codes for implementing the method or device. That is, such a program product is included in the present disclosure, so is a storage medium storing such a program product thereon. Apparently, the storage medium may be any well-known storage medium or any storage medium developed in the future. It should be further pointed out that, in the device and method of the present disclosure, each component or step may be divided or recombined. The dividing and recombining should be regarded as equivalent solutions of the present disclosure. In addition, the steps in the present disclosure may be performed sequentially according to the described order. It is not required that the steps may only be performed sequentially. Some steps may be performed in parallel or independently.

Optional embodiments of the present disclosure are described in the above. It should be noted that those skilled in the art may make various improvements and modifications without departing from the principles described in the present disclosure, and the various improvements and modifications fall within the protection scope of the present disclosure.

What is claimed is:

1. A method of determining a search space of a carrier, applied to a terminal, comprising:
    in a case that cross-carrier scheduling is configured, determining, according to a search space of a scheduling carrier configured by a network device and a scaling factor, a search space of a carrier other than the scheduling carrier.

2. The method of determining the search space of the carrier according to claim 1, wherein the scaling factor is determined based on PDCCH monitoring capabilities of the terminal on different subcarriers, and/or a proportional relationship between subcarrier spacings of the scheduling carrier and a scheduled carrier.

3. The method of determining the search space of the carrier according to claim 2, wherein,
    the scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor.$$

$M_{cap,scheduled}$ is a PDCCH monitoring capability of the terminal on the scheduled carrier;
$M_{cap,scheduling}$ is a PDCCH monitoring capability of the terminal on the scheduling carrier;
$\lceil \ \rceil$ refers to rounding up, and $\lfloor \ \rfloor$ refers to rounding down.

4. The method of determining the search space of the carrier according to claim 2, wherein,
    the scaling factor K is:

$$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor;$$

$M_{cap,scheduled}$ is a PDCCH monitoring capability of the terminal on the scheduled carrier;
$M_{cap,scheduling}$ is a PDCCH monitoring capability of the terminal on the scheduling carrier;

$SCS_{scheduled}$ is the subcarrier spacing of the scheduled carrier, and $SCS_{scheduling}$ is the subcarrier spacing of the scheduling carrier;

⌈ ⌉ refers to rounding up, and ⌊ ⌋ refers to rounding down.

5. The method of determining the search space of the carrier according to claim 1, wherein determining, according to the search space configured by the network device for the scheduling carrier and the scaling factor, the search space of the carrier other than the scheduling carrier comprises:

determining, according to the search space configured by the network device for the scheduling carrier and the scaling factor, a search space of a scheduled carrier.

6. The method of determining the search space of the carrier according to claim 5, wherein the determining, according to the search space configured by the network device for the scheduling carrier and the scaling factor, the search space of the scheduled carrier comprises:

determining, according to the quantity of candidate physical downlink control channels (PDCCH) comprised in each aggregation level of the scheduling carrier and the scaling factor, the quantity of candidate PDCCHs comprised in each aggregation level of the search space of the scheduled carrier; and determining, according to the quantity of candidate PDCCHs comprised in each aggregation level of the search space of the scheduled carrier, the search space of the scheduled carrier.

7. The method of determining the search space of the carrier according to claim 6, wherein determining, according to the quantity of candidate PDCCHs comprised in each aggregation level of the scheduling carrier and the scaling factor, the quantity of candidate PDCCHs comprised in each aggregation level of the scheduled carrier comprises:

determining the quantity of candidate PDCCHs comprised in each aggregation level of the scheduled carrier through $AL_{Y,scheduled} = \lceil AL_{Y,scheduling} \times K \rceil$ or $AL_{Y,scheduled} = \lfloor AL_{Y,scheduling} \times K \rfloor$;

wherein $AL_{Y,scheduled}$ is the quantity of candidate PDCCHs comprised in each aggregation level of the scheduled carrier;

K is a scaling factor of the scheduling carrier;

⌈ ⌉ refers to rounding up, and ⌊ ⌋ refers to rounding down.

8. The method of determining the search space of the carrier according to claim 7, wherein, in a case that $AL_{Y,scheduling} \neq 0$, a minimum value of $AL_{Y,scheduled}$ is 1.

9. The method of determining the search space of the carrier according to claim 1, wherein the search space of the scheduling carrier is larger than a search space of a scheduled carrier.

10. The method of determining the search space of the carrier according to claim 9, wherein a starting position of the search space of the scheduled carrier in the search space of the scheduling carrier is determined according to a value of a carrier indicator field (CIF).

11. A method of determining a search space of a carrier, applied to a network device, comprising:

in a case that cross-carrier scheduling is configured for a terminal, determining, according to a search space of a scheduling carrier configured for the terminal and a scaling factor, a search space of a carrier other than the scheduling carrier.

12. The method of determining the search space of the carrier according to claim 11, wherein the scaling factor is determined based on PDCCH monitoring capabilities of the terminal on different subcarriers, and/or a proportional relationship between subcarrier spacings of the scheduling carrier and a scheduled carrier.

13. The method of determining the search space of the carrier according to claim 12, wherein, the scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor.$$

$M_{cap,scheduled}$ is a PDCCH monitoring capability of the terminal on the scheduled carrier;

$M_{cap,scheduling}$ is a PDCCH monitoring capability of the terminal on the scheduling carrier;

⌈ ⌉ refers to rounding up, and ⌊ ⌋ refers to rounding down; or the scaling factor K is $$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor;$$

$M_{cap,scheduled}$ is a PDCCH monitoring capability of the terminal on the scheduled carrier; $M_{cap,scheduling}$ is a PDCCH monitoring capability of the terminal on the scheduling carrier; $SCS_{scheduled}$ is the subcarrier spacing of the scheduled carrier, and $SCS_{scheduling}$ is the subcarrier spacing of the scheduling carrier; ⌈ ⌉ refers to rounding up, and ⌊ ⌋ refers to rounding down.

14. The method of determining the search space of the carrier according to claim 11, wherein the determining, according to the search space of the scheduling carrier configured for the terminal and the scaling factor, the search space of the carrier other than the scheduling carrier comprises:

determining, according to the search space of the scheduling carrier configured for the terminal and the scaling factor, a search space of a scheduled carrier;

wherein the determining according to the search space of the scheduling carrier configured for the terminal and the scaling factor, the search space of the scheduled carrier comprises:

determining, according to the quantity of candidate physical downlink control channels (PDCCH) comprised in each aggregation level of the scheduling carrier and the scaling factor, the quantity of candidate PDCCHs comprised in each aggregation level of the search space of the scheduled carrier; and determining, according to the quantity of candidate PDCCHs comprised in each aggregation level of the search space of the scheduled carrier, the search space of the scheduled carrier.

15. A terminal, comprising:

a processor, configured to: in a case that cross-carrier scheduling is configured, determine, according to a search space of a scheduling carrier configured by a network device and a scaling factor, a search space of a carrier other than the scheduling carrier.

16. A network device, comprising:
a processor configured to perform the method according to claim 11.

17. The network device according to claim 16, wherein the scaling factor is determined based on PDCCH monitoring capabilities of the terminal on different subcarriers, and/or a proportional relationship between subcarrier spacings of the scheduling carrier and a scheduled carrier.

18. The network device according to claim 17, wherein, the scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor.$$

$M_{cap,scheduled}$ is a PDCCH monitoring capability of the terminal on the scheduled carrier; $M_{cap,scheduling}$ is a PDCCH monitoring capability of the terminal on the scheduling carrier; $\lceil\ \rceil$ refers to rounding up, and $\lfloor\ \rfloor$ refers to rounding down; or,
the scaling factor K is $$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor;$$

$M_{cap,scheduled}$ is a PDCCH monitoring capability of the terminal on the scheduled carrier; $M_{cap,scheduling}$ is a PDCCH monitoring capability of the terminal on the scheduling carrier; $SCS_{scheduled}$ is the subcarrier spacing of the scheduled carrier, and $SCS_{scheduling}$ is the subcarrier spacing of the scheduling carrier; $\lceil\ \rceil$ refers to rounding up, and $\lfloor\ \rfloor$ refers to rounding down.

19. The terminal according to claim 15, wherein the scaling factor is determined based on PDCCH monitoring capabilities of the terminal on different subcarriers, and/or a proportional relationship between subcarrier spacings of the scheduling carrier and a scheduled carrier.

20. The terminal according to claim 19, wherein, the scaling factor K is $$\frac{M_{cap,scheduled}}{M_{cap,scheduling}}, \left\lceil \frac{M_{cap,scheduled}}{M_{cap,scheduling}} \right\rceil \text{ or } \left\lfloor \frac{M_{cap,scheduled}}{M_{cap,scheduling}} \right\rfloor,$$

$M_{cap,scheduled}$ is a PDCCH monitoring capability of the terminal on the scheduled carrier; $M_{cap,scheduling}$ is a PDCCH monitoring capability of the terminal on the scheduling carrier; $\lceil\ \rceil$ refers to rounding up, and $\lfloor\ \rfloor$ refers to rounding down; or,
the scaling factor K is $$\frac{M_{cap,scheduled}}{M_{cap,scheduling}} \times \frac{SCS_{scheduled}}{SCS_{scheduling}}, \text{ or}$$

$$\left\lceil \frac{M_{cap,scheduled}}{M_{cap,scheduling}} \times \frac{SCS_{scheduled}}{SCS_{scheduling}} \right\rceil, \text{ or}$$

$$\left\lfloor \frac{M_{cap,scheduled}}{M_{cap,scheduling}} \times \frac{SCS_{scheduled}}{SCS_{scheduling}} \right\rfloor;$$

$M_{cap,scheduled}$ is a PDCCH monitoring capability of the terminal on the scheduled carrier; $M_{cap,scheduling}$ is a PDCCH monitoring capability of the terminal on the scheduling carrier; $SCS_{scheduled}$ is the subcarrier spacing of the scheduled carrier, and $SCS_{scheduling}$ is the subcarrier spacing of the scheduling carrier; $\lceil\ \rceil$ refers to rounding up, and $\lfloor\ \rfloor$ refers to rounding down.

\* \* \* \* \*